United States Patent [19]

Charlton

[11] Patent Number: 5,268,875
[45] Date of Patent: Dec. 7, 1993

[54] ACOUSTIC DECOY

[75] Inventor: John D. Charlton, Lancaster, Calif.

[73] Assignee: The United States of America as represented by the Secretary of the Navy, Washington, D.C.

[21] Appl. No.: 640,437

[22] Filed: May 11, 1967

[51] Int. Cl.⁵ ............................................. H04K 3/00
[52] U.S. Cl. ........................................... 367/1; 434/9
[58] Field of Search ................... 340/3 E, 3 S, 5 D, 2; 367/1; 434/6, 7, 10

[56] References Cited

U.S. PATENT DOCUMENTS 2,887,671  5/1959  Frankel et al. ............................ 367/1
3,180,295  4/1965  Niederer .................................. 367/1

Primary Examiner—Daniel T. Pihulic
Attorney, Agent, or Firm—Thomas E. McDonnell

[57] ABSTRACT

A sonar countermeasure comprising a decoy device that carries apparatus for receiving, processing and transmitting sonar signals. Processing apparatus includes magnetic tape storage, staggered record and read heads and time varying partial erase heads which produce realistic "echo" of received sonar search signals.

5 Claims, 2 Drawing Sheets

ACOUSTIC DECOY

The invention described herein may be manufactured and used by or for the Government of the United States of America for governmental purposes without the payment of any royalties thereon or therefor.

FIELD OF THE INVENTION

The present invention is broadly related to the art of submarine protection against sonar detection and attack and more particularly to an acoustic decoy which is equipped to receive a sonar search signal and to propagate a realistic "echo" of that signal with the intend of deceiving the enemy personnel or instrumentality using the search sonar.

DESCRIPTION OF THE PRIOR ART

Underwater warfare is rapidly growing both in technological complexity and in military importance. This consideration alone obviously makes the protection of a submarine from detection and attack a matter of tremendous importance. This obvious importance is further magnified upon consideration of the very large recent increases in the resource investment (in terms of crew size and skill, nuclear attack capability, reactor type propulsion equipment, deep sea structure, etc) in the individual submarine. Unfortunately, from the view of protecting the submarine, the increase in submarine size and the refinement of sonar and of the so-called acoustic torpedoes, i.e. torpedoes which are guided to their target by sonar equipment carried on the torpedo, have made the submarine more easily detected and more susceptible to attack and have therefore further intensified the need for protecting the submarine from both sonar detection and attack.

Understandably much effort has been spent in developing a variety of sonar countermeasures, of which the acoustic decoy is certainly one of the most promising. Acoustic decoys are usually either towed by or launched from a submarine and function to propagate sonic energy which is intended to either mask the operational noise of the submarine or to cause searching sonar or acoustic torpedoes to lock on (track) the decoy.

One type of prior acoustic decoy used uneven gear trains to generate noise approximating the noise from a real submarine. Another, and perhaps more effective, type of prior acoustic decoy carried apparatus which received, amplified and propagated the searching sonar signals, with the intent of deceiving the sonar operator or instrumentality into believing the sonar search signal had been echoed by a submarine. However, recent advances will cause the logic and signal processing units of acoustic torpedo control systems to quickly recognize the falsity of such deceptive signals and have clearly made the described types of prior decoys almost useless.

SUMMARY OF THE INVENTION

The general purpose of this invention is to provide an acoustic decoy that propagates sonic energy which will deceive enemy sonar operators or torpedoes using search sonar into deciding that the decoy is a submarine. More specifically, the invention provides an acoustic decoy which carries a system which receives a sonar search signal, processes this signal by means of novel magnetic tape apparatus to produce a signal which is propagated and which very closely resembles the actual "echo" signal that would result from the particular sonar search signal reflecting from a real submarine.

It is, therefore, an object of the present invention to provide an improved sonar countermeasure.

Another object is to provide an improved acoustic decoy.

Still another object of the invention is the provision of an improved sonar countermeasure in the form of an acoustic decoy that propagates sonic energy which is intended to deceive the enemy.

A still further object is to provide an acoustic decoy which receives a sonar search signal, processes this signal to produce a realistic "echo" signal and propagates the "echo" signal.

BRIEF DESCRIPTION OF THE DRAWING

Other objects and features of the invention will become apparent to those skilled in the art as the disclosure is made in the following description of a preferred embodiment of the invention as illustrated in the accompanying drawings in which.

DESCRIPTION OF THE PREFERRED EMBODIMENT

Figure 1:
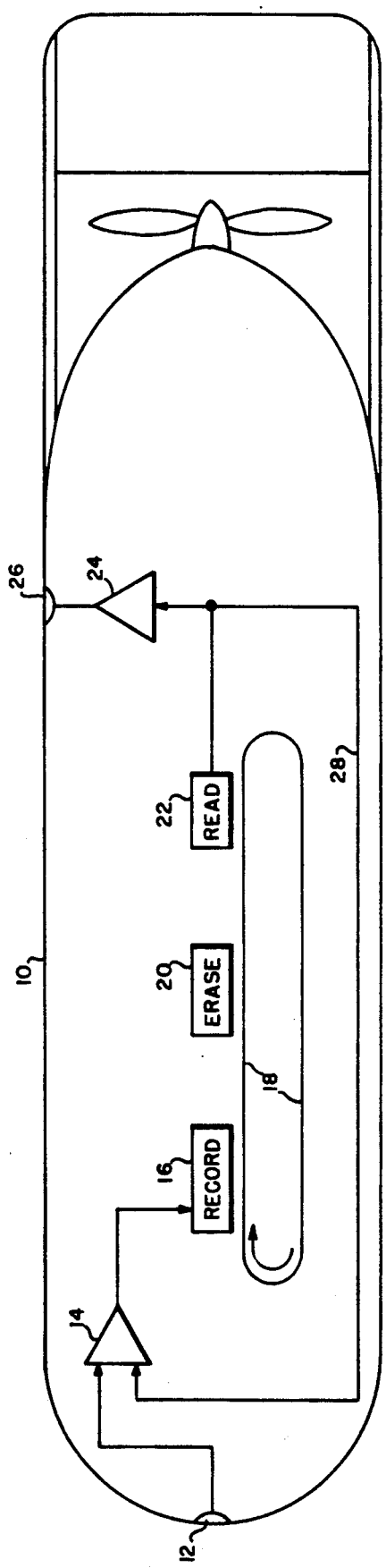
FIG. 1 diagrammatically illustrates the invention.

Referring now to the drawings, wherein like reference characters designate like or corresponding parts throughout the several Figs., there is diagrammatically shown in FIG. 1 an acoustic decoy 10 which is either towed by or launched from a submarine. An electroacoustic transducer 12 is designed and located on decoy 10 to produce, in conventional manner, electrical signals in response to sonar search signals. These sonar search signals may originate from enemy surface ships, submarines, sonar surveillance buoys or from an enemy acoustic torpedo which includes a sonar guidance control system.

Transducer 12 is connected to amplifier 14 which raises the transducer signal to sufficient strength to drive record head 16 to write the transducer signal on the moving magnetic tape loop 18. Record head 16, as well as the partial erase head 20 and the read head 22, are (for the sake of drafting simplicity) diagrammatically illustrated as single components in FIG. 1. However, the reader should realize, and this will become more apparent when FIGS. 2 and 3 are discussed, that record head 16 and read head 22 are each comprised of a plurality of randomly staggered heads and that partial erase head 20 also includes a plurality of variable attenuating heads.

As shown in FIG. 1, the partial erase head 20 variably attenuates the signals on the tape loop 18 after which the attenuated signals energize read head 22 to produce an electrical signal that, after suitable amplification by amplifier 24, drives electroacoustic transducer 26. Transducer 26 is located on decoy 10 so that it will cause an acoustic signal to be propagated through the sea as a result of the electric signal applied to transducer 26 by amplifier 24. In some circumstances it may be desirable to include a feedback loop 28 to prevent undesired oscillations.

Figure 2:
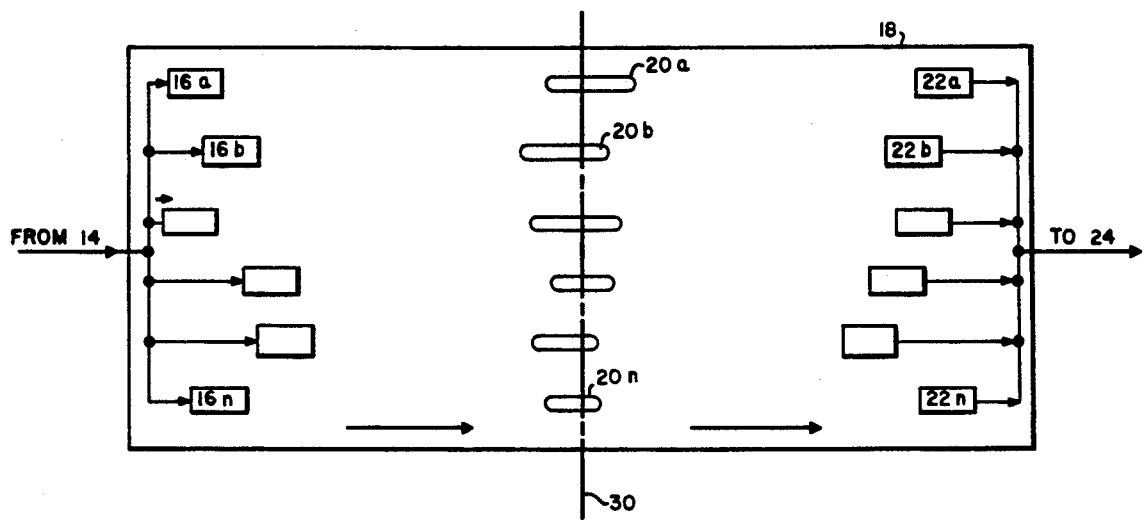
FIG. 2 shows the arrangement of the record, partial erase and read heads of the invention
Figure 3:
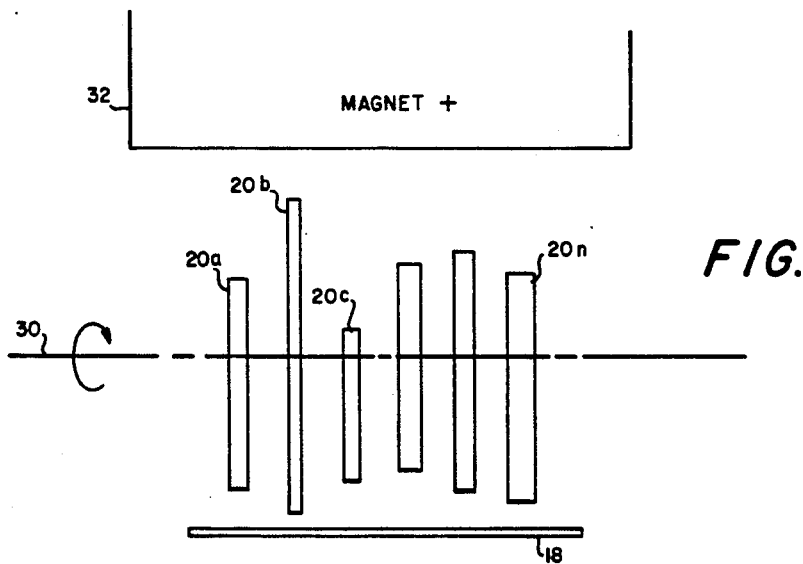
FIG. 3 illustrates the partial erase head in more detail.

Referring now to FIG. 2, it will be seen that record head 16 consists of a plurality (which could obviously be more or less than the illustrated six) of conventional heads 16a ... 16n that are randomly staggered across the tape 18. Similarly the read head 22 consists of a plurality of heads 22a ... 22n which, while individually aligned with one of the read heads 16a ... 16n, are randomly staggered across the tape 18. The erase head 20, which is shown in more detail in FIG. 3, consists of a plurality of eccentric cams 20a ... 20n preferably made of a high permeability material. The eccentric cams 20a ... 20n are, relative to each other, angularly randomly oriented about the axis 30 and are also rotated together about axis 30. This axis extends between the opposite poles 32 and 34 of a magnet and, as shown in FIG. 2, is perpendicular to the direction of travel of tape 18. It can also be observed from FIGS. 2 and 3 that the eccentric cams 20a ... 20n are not necessarily the same size.

The operation of the decoy 10 will now be described in the environment of being towed behind a submarine which is attempting to survive an attack by acoustic torpedoes. It will be obvious to the reader that the decoy 10 could be used in deceiving the enemy in many other ways.

The sonar search signals of the acoustic torpedo are received by transducer 12, raised in power level by the amplifier 14 and recorded on the moving magnetic tape loop 18 by the randomly located heads 16a ... 16n. The signals written on the tape 18 are partially erased in moving through the air gap between magnetic poles 32 and 34, the extent of the erasure being related to the air gap between the poles. This air gap, and hence the extent of the erasure of the signals on the magnetic tape 18, is constantly varied by the rotation of the eccentric cams 20a ... 20n about the axis 30. Referring to FIG. 3, it can be seen that the air gap associated with cam 20b is much smaller than that associated with cam 20c. The signal on the tape 18 passing by cam 20b is therefore more completely erased than is the signal passing by cam 20c.

The partially erased signals are next sensed by the randomly located read heads 22a ... 22n. It is apparent from FIG. 2 that the read head 22b will sense the signal recorded by head 16b before the read head 22a will sense the signal recorded by head 16a. The signal sensed by read heads 22a ... 22n are combined and raised by amplifier 24 to a suitable power level to drive transducer 26 to propagate a signal into the sea.

In a sense, the signal propagated by transducer 26 will be a reproduction of the sonar search signal received by transducer 12 in that identifying codings of pulse spacing, pulse duration, etc. will be retained. However, because of the "smear" or time spread caused by the random spacings of the heads 16a ... 16n and 22a ... 22n and because of the time varying attenuation caused by partial erase heads 20a ... 20n, the signal propagated by transducer 26 will be so "realistic", that is, so similar to sonar search signals actually reflected from the various structural portions of a submarine, that the enemy torpedo logic and signal processing systems, which are now believed to have the capability of detecting the falsity of simple play-back of received sonar search signals, will not be able to detect the deception perpetrated by decoy 10. Further, the strength of the signal propagated by transducer 26 and the tow distance of the decoy 10 from the submarine is intentionally correlated so that sonar reflections from the submarine are masked by the signal propagated by transducer 26, thereby causing the torpedo to attack the decoy while leaving the submarine in relative safety.

It is by now apparent that there has been disclosed an improved sonar countermeasure in the form of an acoustic decoy which receives a sonar search signal, processes this signal to produce a realistic "echo" signal and propagates this "echo" signal. Obviously many modifications and variations of the present invention are possible in the light of the above teachings. For example, the position of the heads 16a ... 16n and 22a ... 22n could be individually or collectively moved in a random manner to thereby change the propagated signal in a manner which would suggest a change in the orientation of the supposed target. It is therefore to be understood, that within the scope of the appended claims, the invention may be practiced otherwise than as specifically described.

What is claimed and desired to be secured by letters patent of the United States is:

1. An acoustic decoy for protecting a nearby submarine from sonar detection comprising:

Receiving means for receiving a sonar search signal and for producing an electric signal representative of and having a duration equal to said sonar search signal;

Processing means coupled to receive said electric signal and functioning to variably modify the amplitude of said electric signal while substantially maintaining the duration of said electric signal to be representative of the reflection of said sonar search signal from a real submarine and Propagating means coupled to receive and amplify said modified electric signal and to propagate a related acoustic signal Whereby enemy detecting means will more probably detect said decoy than said nearby submarine.

2. An acoustic decoy for protecting a nearby submarine from sonar detection comprising:

A receiving transducer positioned to be exposed to sonar search signals and to produce a first electric signal in response thereto;

A moving loop of magnetic tape;

Recording head means coupled to receive said first electric signal and to make a record thereof on said moving loop of magnetic tape;

Partial erase head means to partially erase, in a continuously variably manner, portions of said record made on said moving loop of magnetic tape;

Read head means located to be energized by said partially erased record on said moving loop of magnetic tape to produce a second electric signal in response to said energization;

A propagating transducer connected to receive said second electric signal and positioned to propagate an acoustic signal in response to said second electric signal.

3. An acoustic decoy as set forth in claim 2 wherein said recording head means includes a plurality n of individual recording heads, each connected to receive said first electric signal, said plurality of recording heads being arranged in a random pattern which is generally perpendicular to the direction of movement of said loop of magnetic tape.

4. An acoustic decoy as set forth in claim 3 wherein said partial erase head means comprises:

First and second magnetic poles of opposed polarity, said loop of magnetic tape passing between said first and second magnetic poles and closer to said second magnetic pole;

An axis perpendicular to the direction of movement of said loop of magnetic tape and located between said first magnetic pole and said loop of magnetic tape and A plurality n of eccentric cams made of a high permeability material, said cams being randomly angularly oriented on said axis and rotating together about said axis.

5. An acoustic decoy as set forth in claim 4 wherein said read head means includes a plurality n of individual read heads, each connected to said propagating transducer, said plurality of read heads being arranged in a random pattern which is generally perpendicular to the direction of movement of said loop of magnetic tape.

* * * * *